United States Patent
Daly, Sr.

(10) Patent No.: US 11,220,280 B2
(45) Date of Patent: Jan. 11, 2022

(54) LANDSCAPING CART

(71) Applicant: Brian Patrick Daly, Sr., Pleasant Valley, NY (US)

(72) Inventor: Brian Patrick Daly, Sr., Pleasant Valley, NY (US)

( * ) Notice: Subject to any disclaimer, the term of this patent is extended or adjusted under 35 U.S.C. 154(b) by 169 days.

(21) Appl. No.: 16/778,759

(22) Filed: Jan. 31, 2020

(65) Prior Publication Data

US 2020/0247445 A1 Aug. 6, 2020

Related U.S. Application Data

(60) Provisional application No. 62/800,008, filed on Feb. 1, 2019.

(51) Int. Cl.
*B62B 3/00* (2006.01)
*B62B 1/18* (2006.01)

(52) U.S. Cl.
CPC .................................. *B62B 3/005* (2013.01)

(58) Field of Classification Search
CPC ....................................................... B62B 3/00
See application file for complete search history.

(56) References Cited

U.S. PATENT DOCUMENTS

| | | | | |
|---|---|---|---|---|
| 1,201,123 A | * | 10/1916 | Walworth | B62B 1/24 298/3 |
| 1,292,689 A | * | 1/1919 | Bludworth | B62B 1/24 298/3 |
| 1,390,122 A | * | 9/1921 | Gilbert | B62B 1/24 298/19 R |
| 1,497,478 A | * | 6/1924 | Bludworth | B62B 1/22 298/3 |
| 8,356,823 B1 | * | 1/2013 | Berginc | B62B 1/24 280/30 |
| 9,248,850 B1 | * | 2/2016 | Romas | B62B 1/22 |
| 10,112,635 B1 | * | 10/2018 | Jin | B60P 1/286 |

* cited by examiner

*Primary Examiner* — Bryan A Evans
(74) *Attorney, Agent, or Firm* — Dunlap Bennett & Ludwig, PLLC

(57) ABSTRACT

A landscaping cart is provided. The landscaping cart has a barrow portion operatively associated with a cart frame having wheels. The cart frame provides an open configuration dimensioned and adapted to accommodate the barrow portion in a nested condition so that the barrow portion can slide and rotate therein. The barrow portion provides an external spring mechanism that enables the barrow portion to move from a supported position on top of the cart frame to the nested position for the process of urging lawn debris into the barrow portion. The supported position facilitates upright transportation of the lawn debris retained in the barrow portion. The cart frame may provide a support bar for supporting the barrow portion in the nested condition. A bucket portion for compacting the lawn debris connects to a distal end of the barrow portion.

11 Claims, 4 Drawing Sheets

LANDSCAPING CART

CROSS-REFERENCE TO RELATED APPLICATION

This application claims the benefit of priority of U.S. provisional application No. 62/800,008, filed 1 Feb. 2019, the contents of which are herein incorporated by reference.

BACKGROUND OF THE INVENTION

The present invention relates to landscaping tools and accessories and, more particularly, to a landscaping cart for amassing, storing and transporting landscaping debris.

Raking and accumulating and transporting yard debris can be a time-consuming and energy exhaustive chore. Unfortunately, current devices adapted for such purposes are inefficient, inaccurate, and unsteady as they all require the yard debris to first be raked into a pile, before being collected, and then transported without mechanical advantage. This demands more effort through having to initially accumulate and amass debris in a pile before removal can begin.

As can be seen, there is a need for a landscaping cart that enables one to collect yard debris as they rake, with greater accuracy and with less effort required from the prior art, thereby eliminating the need to first accumulate yard debris into piles. The landscaping cart of the present invention allows for debris to be raked directly into a barrow portion, which is transported on wheels, allowing the user to move freely about the yard removing large amounts of debris with less physical effort compared to the prior art.

SUMMARY OF THE INVENTION

In one aspect of the present invention, a landscaping cart includes the following: a cart frame providing two frame members spaced apart to accommodate an opening therebetween; at least two wheels rotatably mounted to a lower portion of the cart frame; a barrow frame dimensioned to fit within the opening in a nested position; a side member attached to a periphery of the barrow frame to move between a contracted condition and an expanded condition, wherein the side member is biased in the expanded condition; the expanded condition enables the barrow frame to be supported substantially above the cart frame in a supported position; a mouth end provided along a lower portion of a proximal end of the barrow frame, wherein the mouth end extends downward from a remaining portion of the barrow frame; and the nested position enables a front edge of the mouth end to engage a supporting surface on which the at least two wheels ride.

In another aspect of the present invention, the landscaping cart includes the following: a cart frame providing two frame members spaced apart to accommodate an opening therebetween; at least two wheels rotatably mounted to a lower portion of the cart frame; a barrow frame dimensioned to fit within the opening in a nested position; a side member attached to a periphery of the barrow frame to move between a contracted condition and an expanded condition, wherein the side member is biased in the expanded condition; the expanded condition enables the barrow frame to be supported substantially above the cart frame in a supported position; a mouth end provided along a lower portion of a proximal end of the barrow frame, wherein the mouth end extends downward from a remaining portion of the barrow frame, wherein the side member is attached adjacent the mouth end, and wherein the side member operatively is associated with a handle; and the handle is provided by an upper portion of the proximal end of the barrow frame; the nested position enables a front edge of the mouth end to engage a supporting surface on which the at least two wheels ride; a support bar removably attached along the lower portion of the cart frame for supporting the barrow frame in the nested position; at least two swivel casters rotatably mounted to the lower portion of the cart frame for riding on the supporting surface; a bucket frame removably attached to a distal end of the barrow frame; a bucket liner lining the bucket frame; a barrow body lining the barrow frame; and at least one support bar fastener connected to the cart frame for removably attaching the support bar when the support bar is not supporting the barrow frame.

These and other features, aspects and advantages of the present invention will become better understood with reference to the following drawings, description and claims.

DETAILED DESCRIPTION OF THE INVENTION

Figure 1:
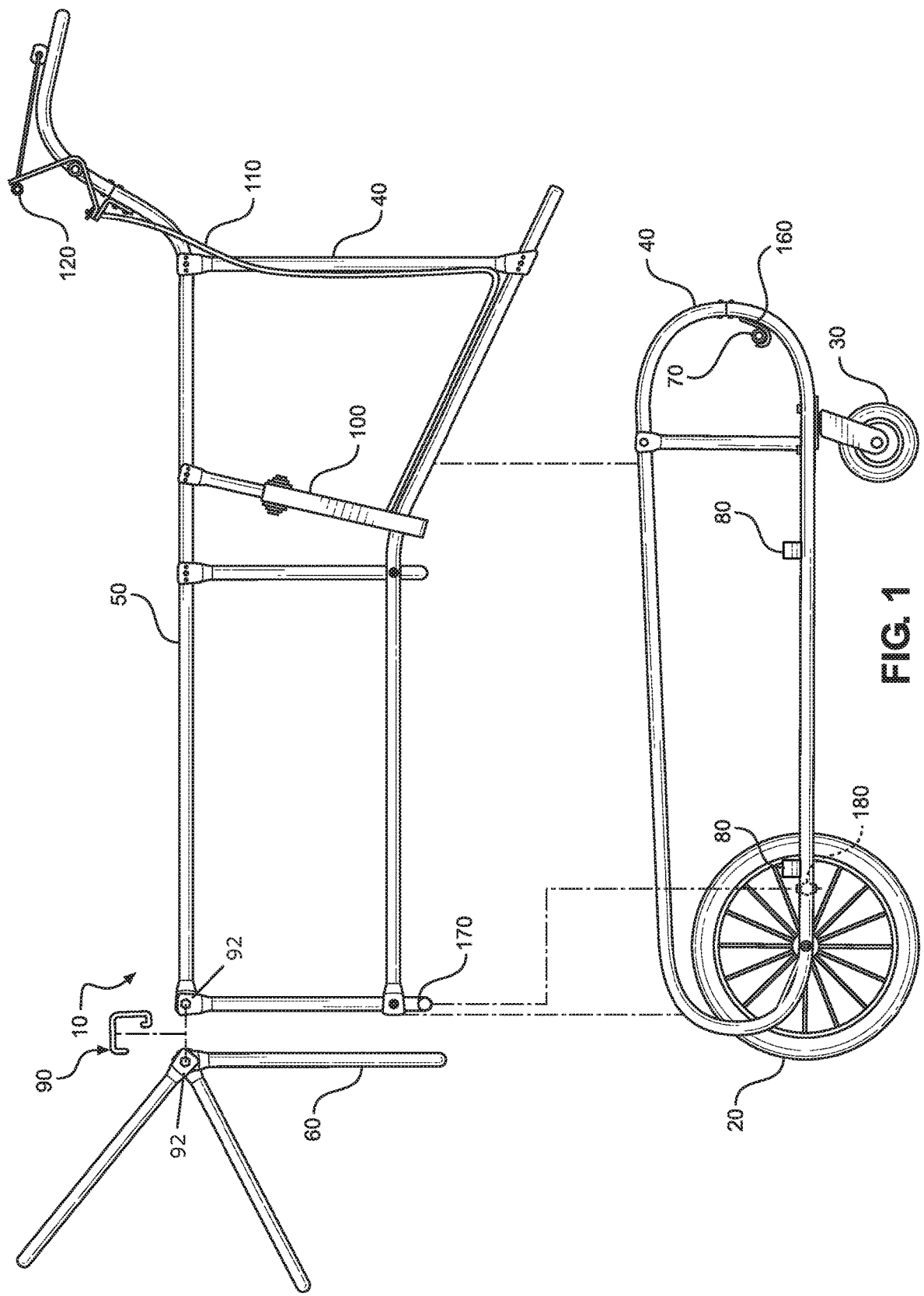
FIG. 1 is an exploded side view of an exemplary embodiment of the present invention.
Figure 2:
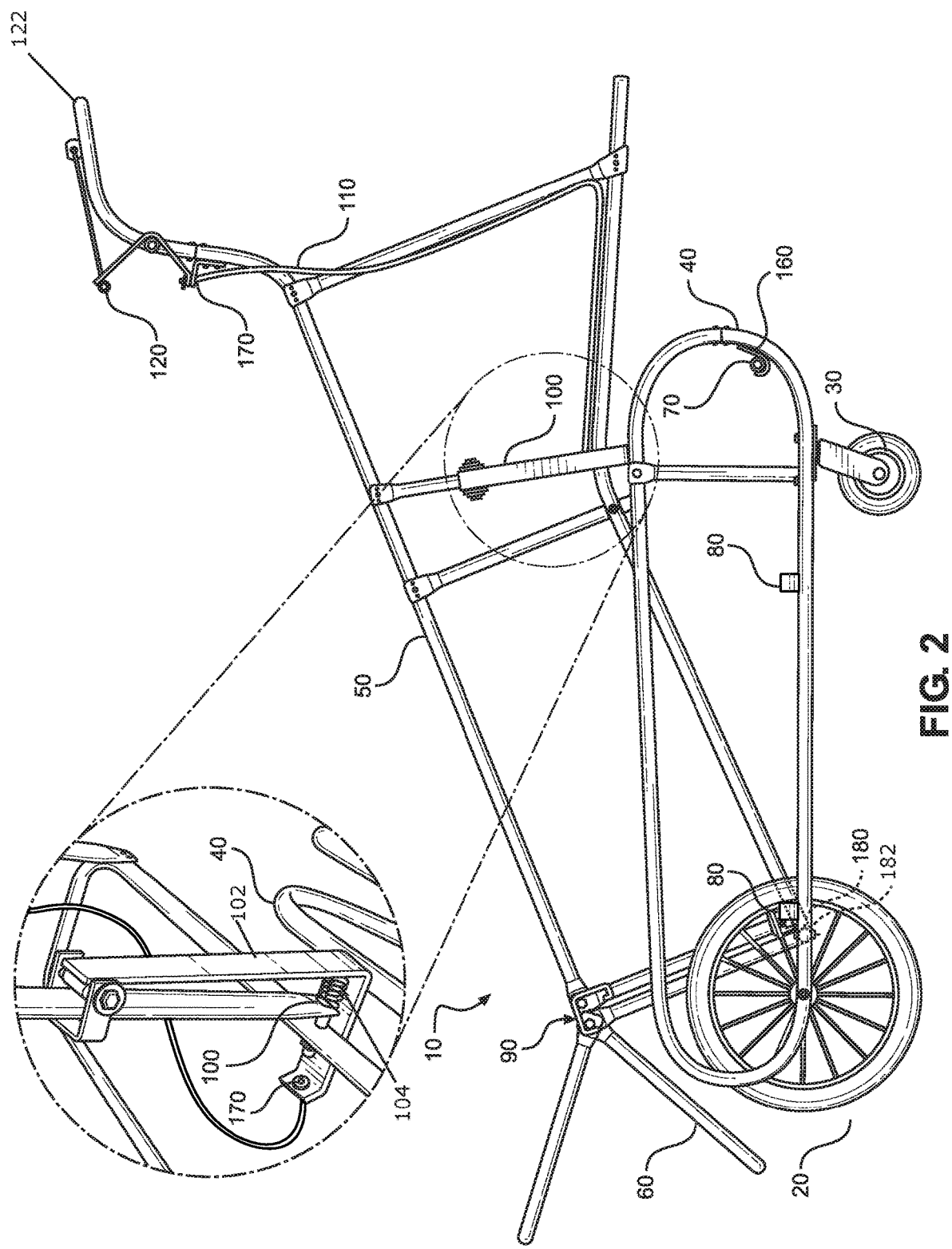
FIG. 2 is an assembled side view of an exemplary embodiment of the framing of the present invention, including a barrow frame 50 shown in a supported position and a detailed view up of a spring mechanism 100 enabling the supported position.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a landscaping cart having a barrow portion operatively associated with a cart frame having wheels. The cart frame provides an open configuration dimensioned and adapted to accommodate the barrow portion in a nested condition within the cart frame so that the barrow portion can slide and rotate therein. The barrow portion provides an external spring mechanism that enables the barrow portion to move from a supported position on top of the cart frame to the nested position for the process of urging lawn debris into the barrow portion. The supported position facilitates upright transportation of the lawn debris retained in the barrow portion. The cart frame may provide a support bar for supporting the barrow portion in the nested condition. A bucket portion for compacting the lawn debris associates with a distal end of the barrow portion.

It should be understood by those skilled in the art that the use of directional terms such as upper, lower, upward, downwardly, top, left, right and the like are used in relation to the illustrative embodiments as they are depicted in the figures, the upward (or upper) direction being toward the top of the corresponding figures, and the downward (or lower) direction being toward the bottom of the corresponding figures.

Referring to FIGS. 1 through 4, the present invention may include a landscaping cart 10 providing a barrow frame 50 operatively associated with a bucket frame 60 and a cart frame.

The cart frame may include two spaced apart frame members 40 enabling an "open configuration" between the two spaced apart frame members 40. Each frame member 40 may be a pair of tubular frames extending from a front end to a rear end. Each frame member 40 may be oval in overall shape, though other shapes may be used as long as the cart frame functions in accordance with the disclosure herein; specifically provided a generally flat upper portion for supporting the barrow frame 50 in a supported position. Each front end of the frame member 40 may be rotatably coupled to a wheel 20, while each rear end may be rotatably connected to a swivel caster 30 or the like. The cart frame may provide framing elements 48 that interconnect the two spaced apart frame members 40 along lower portions thereof to maintain the nestable, open configuration. The cart frame may also provide one or more support bars 70 extending between the two spaced apart frame members 40 by way of support bar fasteners 160 affixed to each frame member 40. The support bar 70 can be used to support the weight of the barrow frame 50 in a nested position, as discussed below. Additionally, support bar storage clips 80 may be provided to store the support bar 70 along one frame member 40 when the support bar 70 is not in use.

The barrow frame 50 rides between the two spaced apart frame members 40 by way of the open configuration. In the nested position, the barrow frame 50 could possibly rest on framing elements 48 interconnecting lower portions of the two spaced apart frame members 40. Specifically, a distal end of the barrow frame 50 may be rotatably connected about a distal framing element 48 of the cart frame by way of a pivot connection 180 so that the proximal end of the barrow frame 50 can pivot between the nested position and a supported position. Though the barrow frame 50 and cart frame can be separated through a release 182 associated with the pivot connection 180. The barrow frame 50 supports a sloping barrow body 130 for retaining debris and other articles therein. The barrow frame 50 may provide cushion edging 150 along its upward facing periphery to prevent injury. The barrow frame 50 extends from a proximal end to a distal end. At the proximal end, the barrow frame 50 tapers downward along a lower portion thereof, defining an open mouth end 54, in part, by way of two spaced apart diagonal members 52. Interconnecting these two spaced apart diagonal members 52 may be a rear width member. The rear width member and/or the two spaced apart diagonal members 52 which accepts a cross member 190 of the cart frame, allowing the rear width member and/or the two spaced apart diagonal members, and thus the barrow frame 50, to rotate concentrically around the cross member 190.

The proximal end provides a handle 122 with a pull lever 120 operatively associated with a pull cable 110. The pull cable 110, by way of cable attachments 170, engages a spring mechanism 100 attached to the barrow frame 50 near the proximal end thereof adjacent the diagonal member 52, as illustrated in the figures.

The spring mechanism 100 provides a side member 102 biased in an expanded condition by way of a spring 104. In the expanded condition, as illustrated in detail in FIG. 2, the side member 102 extends over and beyond a portion of the cart frame member 40. As a result, in the expanded condition, the barrow frame 50 rests on top of the cart frame member 40. When the pull lever 120 is engaged, the spring mechanism 100 moves to a contracted condition so that the barrow frame 50 can move into and through the space provided by the open configuration provided by the cart frame. As a result, the barrow frame 50 can be moved between a supported position supported on the cart frame member(s) 40 and a nested position within the space provided in the middle of the cart frame by the open configuration through engaging the pull lever 120.

The bucket frame 60 removably attaches to the distal end of the barrow frame 50 by way of a bucket to barrow attachment 90. Said attachment 90 may be dimensioned and adapted to interconnect attachment points 92 located on both the bucket frame 60 and the barrow frame 50. The bucket frame 60 supports a bucket liner 130 for retaining debris and other articles therein.

Figure 3:
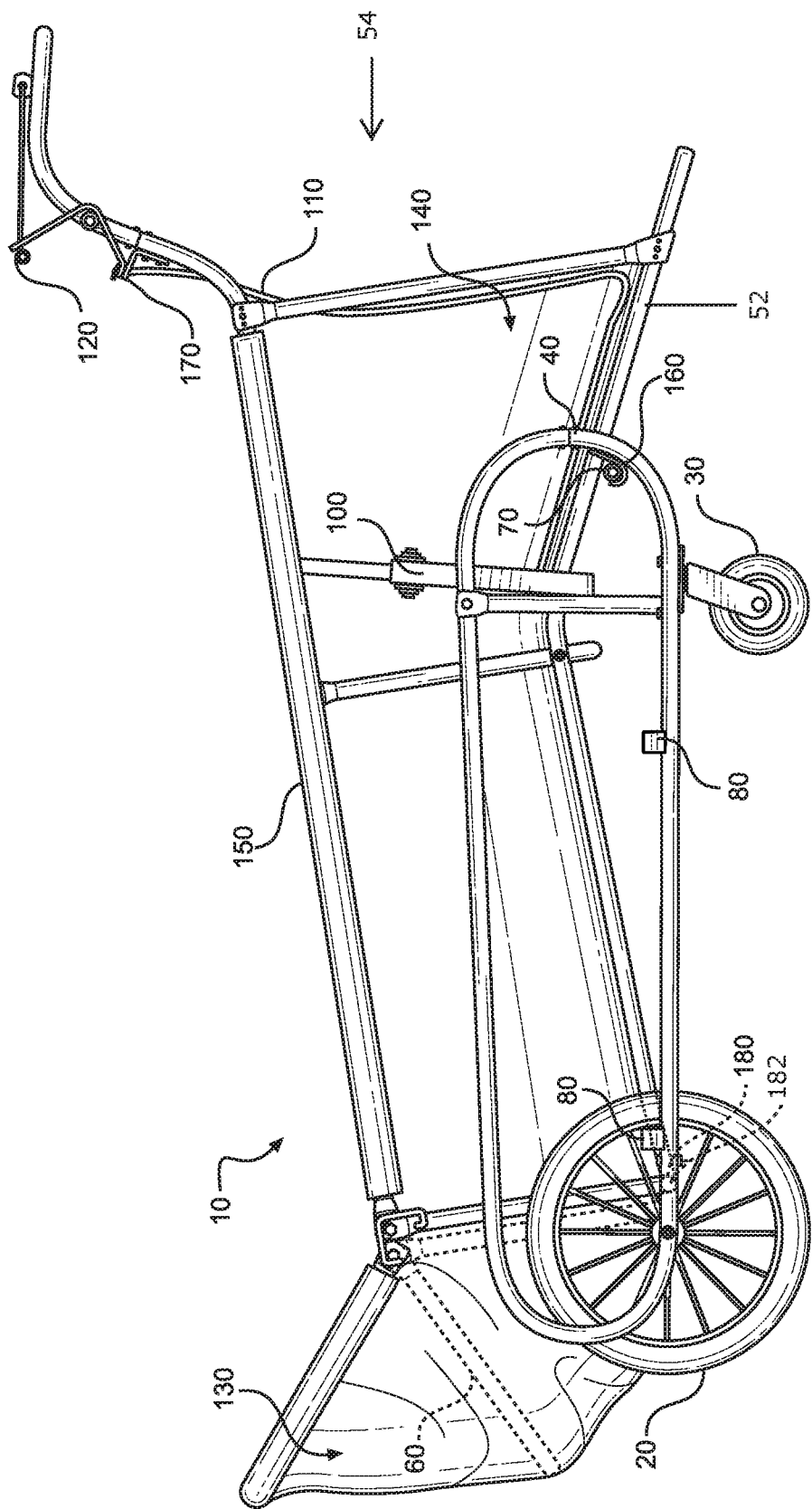
FIG. 3 is an assembled side view of an exemplary embodiment of a landscaping cart frame of the present invention, the barrow frame shown in a nested position.
Figure 4:
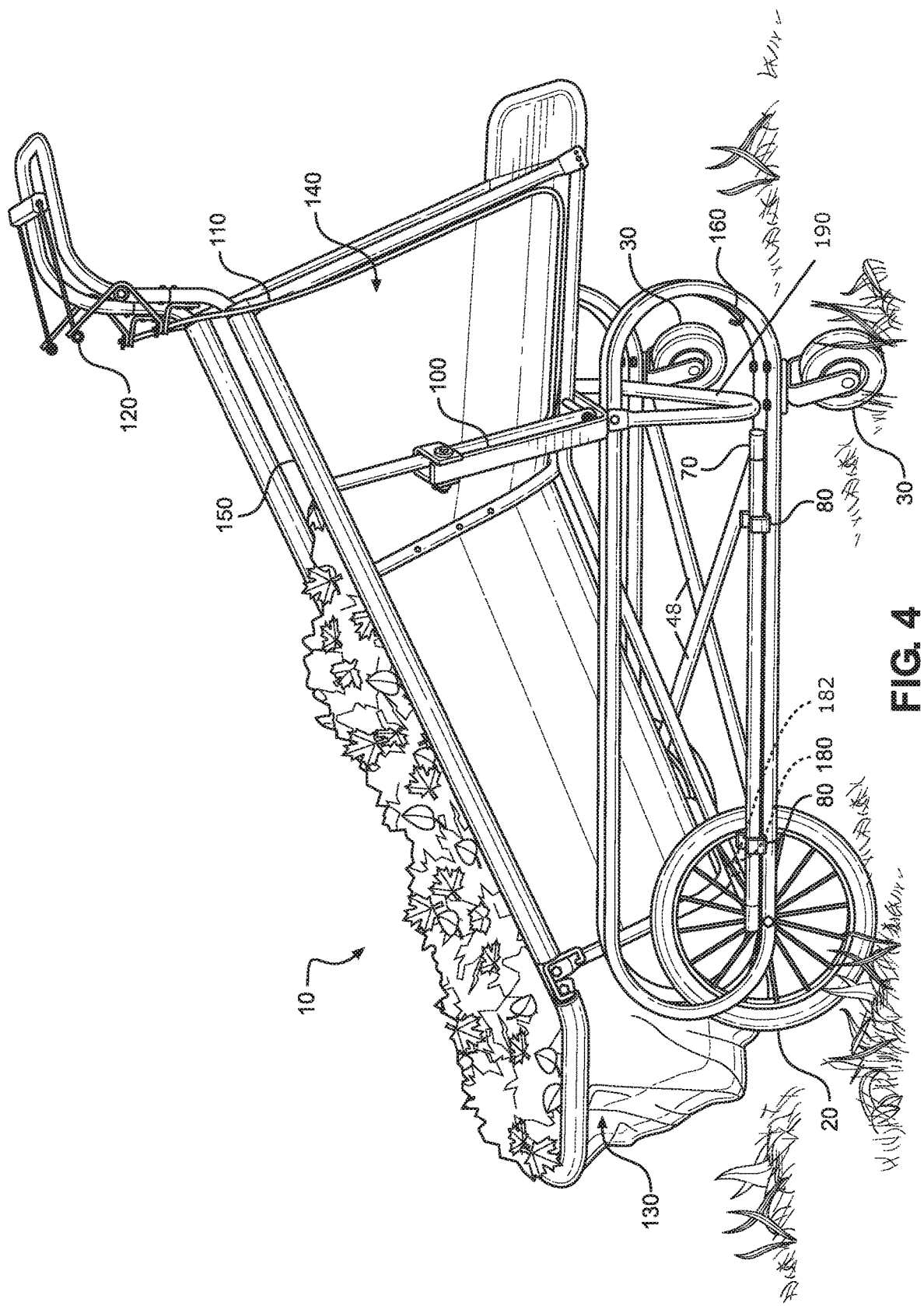
FIG. 4 is a perspective view of an exemplary embodiment of the present invention, shown in use in the supported position.

A method of using the present invention may include the following. The landscaping cart 10 disclosed above may be provided. A user may park the landscaping cart 10 in the supported position over an area to be raked, then by engaging on the pull lever 100, the barrow frame 50 may be rotated downward into the nested positions so that the lowest portion of the mouth end 54, the "lip" edge, makes contact with the ground. The lip edge of the mouth end 54 is rounded allowing for no gaps for debris to slide under. As a result, all debris goes directly into the barrow body 140 and is then compacted in the bucket liner 130. Then the barrow frame 50 may be rotated upward, about the pivot connection 180, where the spring mechanism 100 is urged to the expanded condition, supporting the barrow frame 50 in the supported position, elevated on the cart frame members 40. The supported position allows for compaction of load and easy transport. The process is repeated around designated areas leaving a 100% finished product with just one initial raking. When no more debris can be raked into the barrow body 140, the support bar 70 may be placed in the support bar fasteners 160, allowing the barrow body 140/frame 50 to rest on the support bar 70 in the nested position, as illustrated in FIG. 3 (removing the weight from the spring mechanism 100). This allows for additional weight to be loaded through loading rocks, branches, firewood brush, etc. Now the load can be wheeled to the compost area, where the bucket frame 60 is detached from the barrow frame 50, and the barrow frame 50 is rotated for easy dumping. The bucket frame 60 is then replaced, ready for another load. The present invention can be used solely for hauling by use of the support bar 70—advantageous when spreading mulch, hauling brush, loading firewood, or even moving furniture.

It should be understood, of course, that the foregoing relates to exemplary embodiments of the invention and that modifications may be made without departing from the spirit and scope of the invention as set forth in the following claims.

What is claimed is:

1. A landscaping cart, comprising:
   a cart frame providing two frame members spaced apart to accommodate an opening therebetween;
   at least two wheels rotatably mounted to a lower portion of the cart frame;
   a barrow frame dimensioned to fit within the opening in a nested position;
   a side member attached to a periphery of the barrow frame to move between a contracted condition and an expanded condition, wherein the side member is biased in the expanded condition;

the expanded condition enables the barrow frame to be supported substantially above the cart frame in a supported position;

a mouth end provided along a lower portion of a proximal end of the barrow frame, wherein the mouth end extends downward from a remaining portion of the barrow frame; and the nested position enables a lip edge of the mouth end to engage a supporting surface on which the at least two wheels ride.

2. The landscaping cart of claim 1, further comprising a support bar removably attached along the lower portion of the cart frame for supporting the barrow frame in the nested position.

3. The landscaping cart of claim 1, further comprising at least two swivel casters rotatably mounted to the lower portion of the cart frame for riding on the supporting surface.

4. The landscaping cart of claim 1, further comprising a bucket frame removably attached to an upper distal end of the barrow frame.

5. The landscaping cart of claim 4, further comprising a bucket liner lining the bucket frame.

6. The landscaping cart of claim 1, further comprising a barrow body lining the barrow frame.

7. The landscaping cart of claim 2, further comprising at least one support bar fastener connected to the cart frame for removably attaching the support bar when the support bar is not supporting the barrow frame.

8. The landscaping cart of claim 1, wherein the side member is attached adjacent the mouth end.

9. The landscaping cart of claim 1, wherein the side member is operatively associated with a handle; and the handle is provided by an upper portion of the proximal end of the barrow frame.

10. The landscaping cart of claim 1, further comprising a pivot connection between a lower distal end of the barrow frame and a distal end of the cart frame.

11. A landscaping cart, comprising:
a cart frame providing two frame members spaced apart to accommodate an opening therebetween;
at least two wheels rotatably mounted to a lower portion of the cart frame;
a barrow frame dimensioned to fit within the opening in a nested position;
a side member attached to a periphery of the barrow frame to move between a contracted condition and an expanded condition, wherein the side member is biased in the expanded condition;
the expanded condition enables the barrow frame to be supported substantially above the cart frame in a supported position;
a mouth end provided along a lower portion of a proximal end of the barrow frame, wherein the mouth end extends downward from a remaining portion of the barrow frame, wherein the side member is attached adjacent the mouth end, and wherein the side member operatively is associated with a handle; and the handle is provided by an upper portion of the proximal end of the barrow frame;
the nested position enables a front edge of the mouth end to engage a supporting surface on which the at least two wheels ride;
a pivot connection between a lower distal end of the barrow frame and a distal end of the cart frame;
a support bar removably attached along the lower portion of the cart frame for supporting the barrow frame in the nested position;
at least two swivel casters rotatably mounted to the lower portion of the cart frame for riding on the supporting surface;
a bucket frame removably attached to an upper distal end of the barrow frame;
a bucket liner lining the bucket frame;
a barrow body lining the barrow frame; and
at least one support bar fastener connected to the cart frame for removably attaching the support bar when the support bar is not supporting the barrow frame.

* * * * *